US006678833B1

(12) United States Patent
Grawrock

(10) Patent No.: US 6,678,833 B1
(45) Date of Patent: Jan. 13, 2004

(54) PROTECTION OF BOOT BLOCK DATA AND ACCURATE REPORTING OF BOOT BLOCK CONTENTS

(75) Inventor: David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 597 days.

(21) Appl. No.: 09/608,551

(22) Filed: Jun. 30, 2000

(51) Int. Cl.[7] .................................................. G06F 9/24
(52) U.S. Cl. ................................ 713/401; 713/1; 713/2; 713/100; 713/400
(58) Field of Search ................................ 713/1, 2, 100, 713/401, 400

(56) References Cited

U.S. PATENT DOCUMENTS

| 4,278,837 | A | | 7/1981 | Best |
| 4,633,388 | A | | 12/1986 | Chiu |
| 4,698,617 | A | | 10/1987 | Bauer |
| 4,764,959 | A | | 8/1988 | Watanabe et al. |
| 5,022,077 | A | | 6/1991 | Bealkowski et al. |
| 5,144,659 | A | | 9/1992 | Jones |
| 5,289,540 | A | | 2/1994 | Jones |
| 5,359,659 | A | | 10/1994 | Rosenthal |
| 5,377,264 | A | | 12/1994 | Lee et al. |
| 5,386,469 | A | | 1/1995 | Yearsley et al. |
| 5,421,006 | A | * | 5/1995 | Jablon et al. .................. 714/36 |
| 5,444,850 | A | | 8/1995 | Chang |
| 5,450,489 | A | | 9/1995 | Ostrover et al. |
| 5,465,299 | A | | 11/1995 | Matsumoto et al. |
| 5,479,509 | A | | 12/1995 | Ugon |
| 5,509,120 | A | | 4/1996 | Merkin et al. |
| 5,568,552 | A | | 10/1996 | Davis |
| 5,584,023 | A | | 12/1996 | Hsu |
| 5,644,636 | A | | 7/1997 | Fernandez |
| 5,666,411 | A | | 9/1997 | McCarty |
| 5,671,275 | A | | 9/1997 | Ezuriko |
| 5,699,428 | A | | 12/1997 | McDonnal et al. |
| 5,937,063 | A | * | 8/1999 | Davis .......................... 713/187 |
| 5,977,997 | A | * | 11/1999 | Vainsencher ................. 345/519 |
| 6,003,117 | A | * | 12/1999 | Buer et al. ................... 711/163 |
| 6,137,173 | A | * | 10/2000 | Davis .......................... 257/730 |
| 6,209,098 | B1 | * | 3/2001 | Davis .......................... 713/194 |
| 6,240,516 | B1 | * | 5/2001 | Vainsencher ................. 713/190 |
| 6,266,754 | B1 | * | 7/2001 | Laczko et al. ............... 711/203 |
| 6,289,454 | B1 | * | 9/2001 | Eslinger et al. ............. 713/189 |
| 6,327,660 | B1 | * | 12/2001 | Patel ........................... 713/193 |
| 6,378,072 | B1 | * | 4/2002 | Collins et al. .............. 713/187 |
| 6,421,776 | B1 | * | 7/2002 | Hillis et al. ..................... 713/2 |
| 6,463,535 | B1 | * | 10/2002 | Drews ......................... 713/176 |
| 2001/0008015 | A1 | * | 7/2001 | Vu et al. ..................... 713/189 |

FOREIGN PATENT DOCUMENTS

| DE | 43 15 732 C | | 6/1994 | |
| EP | 961193 A2 | * | 12/1999 | ............. G06F/1/00 |
| WO | WO 00 10283 A | | 2/2000 | |

OTHER PUBLICATIONS

IBM TDB vol. 39,issue 11, p. 51–52, Title: Improved Computer Memory Chip, dtd. Nov. 1, 1996.*
IBM TDB vol. 29,issue 5, p. 1939–1944, Title: Software Protection By decryption on Multi–Usage Serial Interface, dtd. Oct. 1, 1986.*

\* cited by examiner

*Primary Examiner*—Thomas Lee
*Assistant Examiner*—Nitin C. Patel
(74) *Attorney, Agent, or Firm*—Blakely, Sokoloff, Taylor & Zafman LLP

(57) ABSTRACT

In one embodiment, an integrated circuit device comprises a trusted platform module and a boot block memory unit covered by a common package. The boot block memory unit is in communication with the trusted platform module and provides boot information to the trusted platform module. An example of the boot information includes a boot block code.

21 Claims, 3 Drawing Sheets

PROTECTION OF BOOT BLOCK DATA AND ACCURATE REPORTING OF BOOT BLOCK CONTENTS

FIELD

This invention relates to the field of data security. In particular, the invention relates to an apparatus and method for protecting information and accurately reporting this information within an electronic system.

BACKGROUND

Personal computers (PCs) typically include different types of storage components to store programs and data. These storage components include random access memory (RAM), read-only memory (ROM), and memory devices that are located external to the PC (e.g., hard disk or a floppy disk). To load an operating system on a PC, it is necessary to initialize or "boot" the PC by loading and executing boot code. Because the PC typically is unable to access external devices until after it is booted, the boot code is stored internally within the PC.

Typically, a ROM component is used to store the boot code. This boot code, normally referred to as "boot block," is obtained from the ROM and executed. The boot block is coded to (i) locate Basic Input/Output System (BIOS), (ii) load the BIOS for execution, and (iii) pass control to the BIOS. In addition, current platform developments may now require the boot block to report each step of the boot process to a hardware device referred to as a "trusted platform module" (TPM). Defined by the Trusted Computing Platform Alliance, the TPM records the operations of the boot process for subsequent verification by a challenger that the boot process occurred as expected. This poses a number of disadvantages.

For example, the boot block would now need to reliably report the steps of the boot process to the TPM. Thus, to ensure reliable transfer of this data, the boot block would likely require data processing functionality in order to perform cryptographic operations on the data before submission to the TPM.

Additionally, this communication protocol between the boot block and the TPM would be trustworthy only if the boot block is unchangeable. However, this protocol is unable to detect modifications to information regarding the boot process originating from the boot block or replacement of the ROM itself.

BRIEF DESCRIPTION OF THE DRAWINGS

The features and advantages of the present invention will become apparent from the following detailed description of the present invention in which.

DESCRIPTION

The present invention relates to an apparatus and method for protecting information and accurately reporting this information within an electronic system. More specifically, the invention comprises the act of binding the TPM to a boot block memory device. This binding, which may be physical or logically through cryptographic mechanisms, allows the TPM to accurately report the identity of the boot block without reliance on any intervening devices.

Herein, certain details are set forth in order to provide a thorough understanding of the present invention. It is apparent to a person of ordinary skill in the art, however, that the present invention may be practiced through many embodiments other that those illustrated. Well-known circuits are not set forth in detail in order to avoid unnecessarily obscuring the present invention.

In the following description, certain terminology is used to discuss features of the present invention. For example, a "platform" includes any product that performs operations for subsequent analysis and verification of the platform's boot process. Examples of the platform include, but are not limited or restricted to a computer (e.g., desktop, a laptop, a server, a workstation, a personal digital assistant or other hand-held, etc.); communication equipment (e.g., wireless handset, facsimile, etc.); a television set-top box and the like. A "link" is broadly defined as one or more information-carrying mediums such as electrical wire, optical fiber, cable, trace, or even a wireless channel using infrared, radio frequency (RF), or any other wireless signaling mechanism.

In addition, the term "information" is defined as one or more bits of data, address, and/or control. A "software module" includes code that, when executed, performs a certain function. Examples of a software module include an application, an applet, or even a series of code instructions, possibly a subset of code from an applet, acting as a lesser sized software module.

A "cryptographic operation" is an operation performed for additional data security. For example, one type of cryptographic operation involves digital signing information to produce a digital signature. This digital signing operation may be in accordance with Digital Signature Algorithm (DSA). Another type of cryptographic operation involves hashing, namely a one-way conversion of information to a fixed-length representation. Often, this representation, referred to as a "hash value" or a "identifier", is substantially less in size than the original information. It is contemplated that, in some cases, a 1:1 conversion of the original information may be performed.

Figure 1:
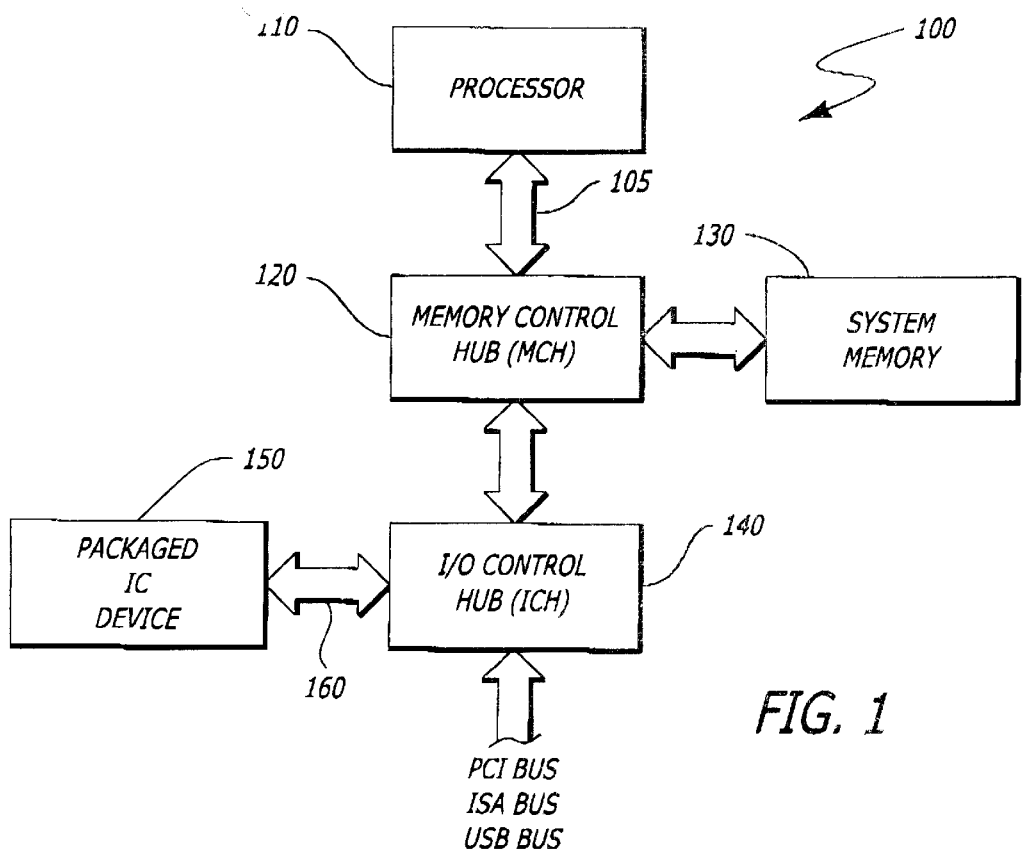
FIG. 1 is an exemplary embodiment of a platform practicing the invention.

Referring to FIG. 1, an exemplary block diagram of an illustrative embodiment of a platform 100 employing the present invention is shown. The platform 100 comprises a processor 110, a memory control hub (MCH) 120, a system memory 130, an input/output control hub (ICH) 140, and a packaged integrated circuit (IC) device 150 which initiates and monitors the boot process of the platform 100. The packaged IC device 150 features a boot block memory unit 220 and a trusted platform module 230 as described in FIG. 2.

As shown in FIG. 1, the processor 110 represents a central processing unit of any type of architecture, such as complex instruction set computers (CISC), reduced instruction set computers (RISC), very long instruction word (VLIW), or a hybrid architecture. In one embodiment, the processor 110 is compatible with the Intel® Architecture (IA) processor, such as the IA-32 and the IA-64. Of course, in an alternative embodiment, the processor 110 may include multiple processing units coupled together over a common host bus 105.

Coupled to the processor 110 via the host bus 105, the MCH 120 may be integrated into a chipset that provides control and configuration of memory and input/output devices such as the system memory 130 and the ICH 140. The system memory 130 stores system code and data. The system memory 130 is typically implemented with dynamic random access memory (DRAM) or static random access memory (SRAM).

The ICH 140 may also be integrated into a chipset together or separate from the MCH 120 to perform I/O functions. As shown, the ICH 140 supports communications with the packaged IC device 150 via link 160. Also, the ICH 140 supports communications with components coupled to other links such as a Peripheral Component Interconnect (PCI) bus at any selected frequency (e.g., 66 megahertz "MHz", 100 MHz, etc.), an Industry Standard Architecture (ISA) bus, a Universal Serial Bus (USB) or another bus configured with a different architecture than those briefly mentioned.

Of course, it is contemplated that the packaged IC device 150 may be employed in a different embodiment than described above. For example, the packaged IC device 150 may be employed within the ICH 140. Thus, the package associated with this embodiment is the package that protects other integrated circuit(s) associated with the functionality of the ICH 140.

Figure 2:
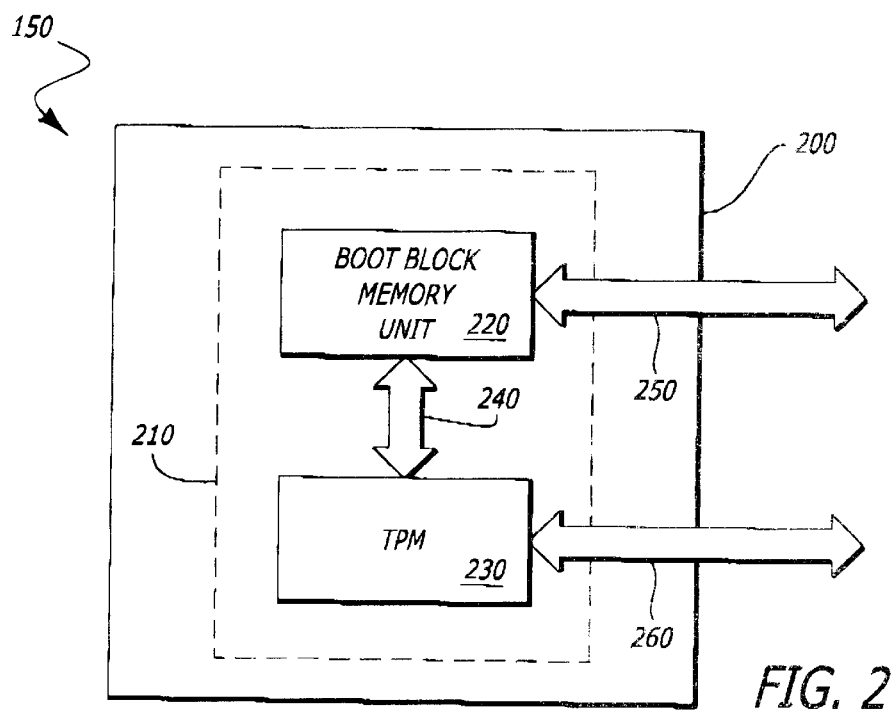
FIG. 2 is an exemplary embodiment of the packaged IC device employed within the platform of FIG. 1.

Referring to FIG. 2, an exemplary embodiment of the packaged IC device 150 is shown. The packaged IC device 150 comprises one or more integrated circuits placed within a protective package 200 such as an IC package, a cartridge covering a removable daughter card and the like. For this embodiment, the packaged IC device 150 comprises a single integrated circuit 210 featuring a boot block memory unit 220 in communication with a trusted platform module (TPM) 230 over a link 240. This single integrated circuit implementation increases the difficulty in monitoring communications between the boot block memory unit 220 and the TPM 230. Of course, although not shown, it is contemplated that the boot block memory unit 220 and the TPM 230 may be implemented as separate integrated circuits.

As shown, the boot block memory unit 220 provides both boot services 250 during initialization and boot information to the TPM 230. For example, the "boot services" may include a root of trust such as a boot block code executed at the start of the initialization process of the platform 100 to locate, load and pass control to the BIOS for example. However, it is contemplated, however, that the entire BIOS may be substituted for the boot block code described above. The "boot information" may be an image of the boot block code or multiple sub-images that collectively represent the boot block code, which is used to monitor the boot process.

Figure 3:
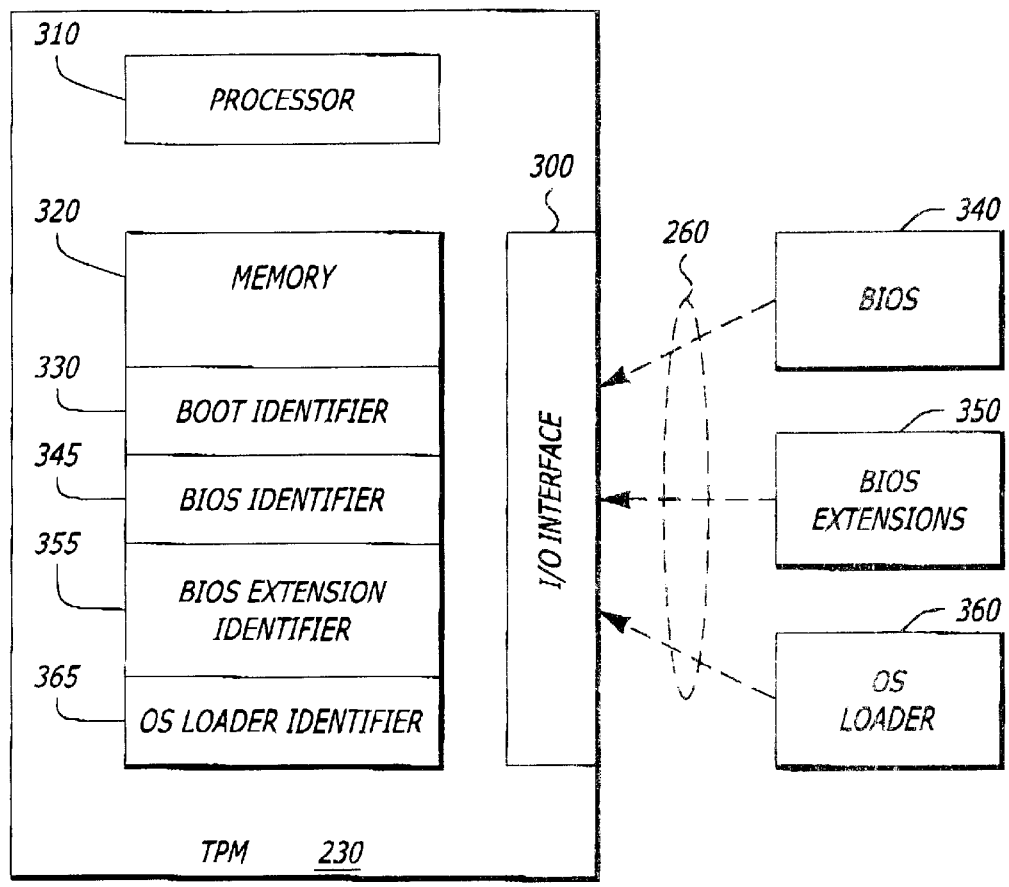
FIG. 3 is an exemplary embodiment of the TPM of FIG. 2.

Referring now to FIG. 3, an exemplary embodiment of the TPM 230 of FIG. 2 is shown. The TPM 230 comprises an input/output (I/O) interface 300, a processor 310, and memory 320 (e.g., volatile and/or non-volatile). Herein, the processor 310 is configured to access certain content within the memory 320 (e.g., software modules, keying material, etc.) to perform cryptographic operations on incoming information. For example, as the TPM extracts the boot information from the boot block memory unit 220 (or even subsequent to that extraction), the processor 310 performs a hash operation on the boot information to produce a boot identifier 330. The boot block identifier 330 is stored in memory 320. For one embodiment, the boot block identifier 330 is calculated for each start-up of the platform 100. In another embodiment, however, the boot block identifier 330 is calculated for a first start-up and retained in non-volatile memory for subsequent use for later start-ups. This is a less secure, but less intensive from a processing standpoint.

Similarly, during initialization, various software modules are provided to the TPM 230. Examples of the modules include BIOS 340, Option ROMs such as BIOS extensions 350, or even a OS loader 360 which is a portion of the operating system that is loaded into the system memory 130 to control loading of the operating system. As an option, these modules 340, 350 and 360 can undergo a hash operation to produce corresponding identifiers 345, 355 and 365 for later use in verification by a challenger.

The TPM 230 further responds to inquiry requests from a challenger. A "challenger" may be any electronic device within the platform or even external to the platform. The "inquiry request" may be in the form of a challenge message, namely information encrypted with keying material (e.g., a public key of TPM, symmetric key, etc.) accessible by the TPM 230. In response, the TPM 230 provides TPM services such as a digital signature featuring the boot block identifier 330, keying material, certificates and the like.

Figure 4:
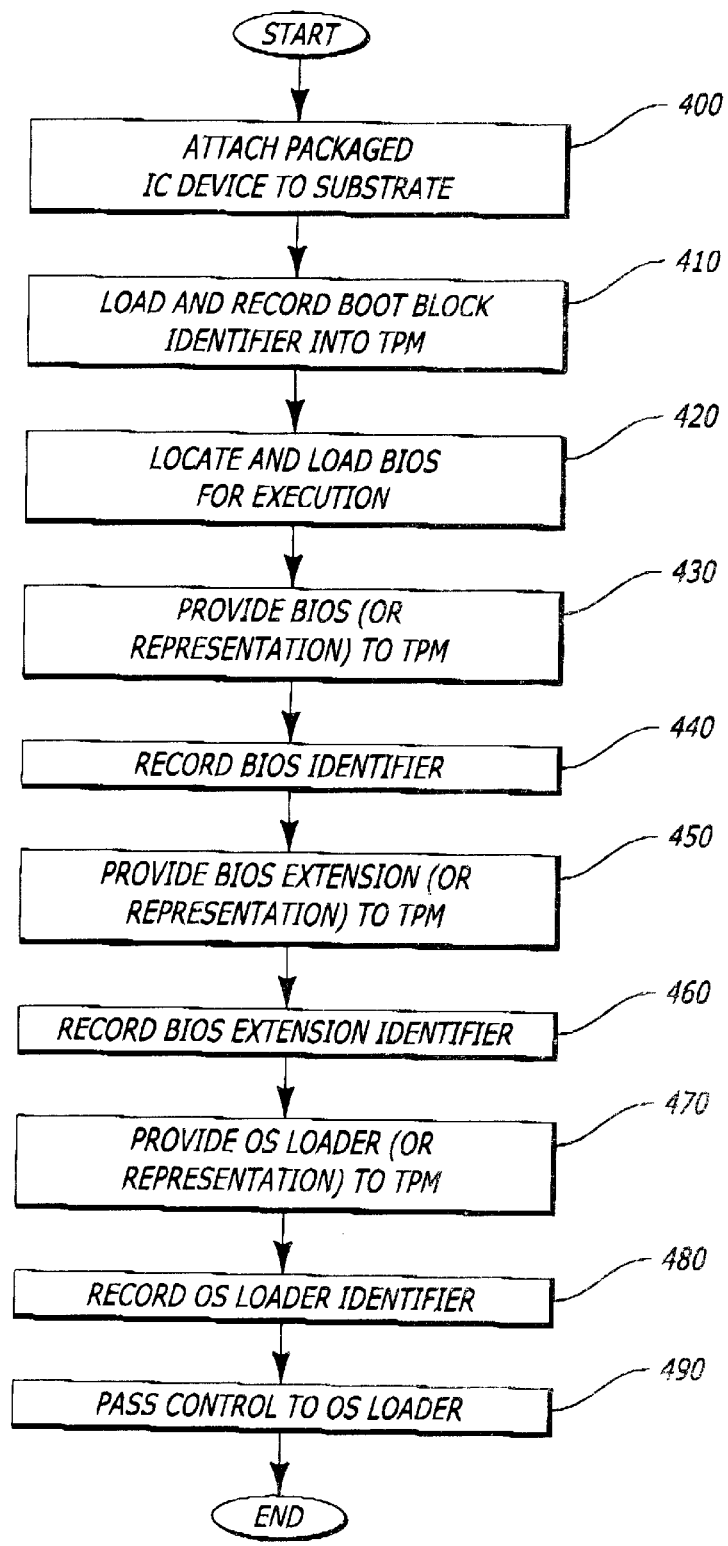
FIG. 4 is an exemplary embodiment of a flowchart illustrating the operations during initialization of the platform of FIG. 1.

Referring to FIG. 4, a flowchart illustrating the operations during initialization of the platform 100 of FIG. 1 is shown. Initially, the packaged IC device is directly attached to a substrate of a platform by soldering for example (block 400). If the packaged IC device is coupled to a socket, a logical binding should exist between the socket and the packaged IC device. During initialization, the boot block memory unit loads and records its boot block identifier into memory of the TPM (block 410). Next, the boot block memory unit locates and loads the BIOS for execution (block 420). The BIOS (or a representation thereof) is provided to the TPM and a BIOS identifier is recorded (blocks 430 and 440). Thereafter, the BIOS loads its extensions and the OS Loader and provides these extensions and OS Loader (or representations thereof) to the TPM for recordation, respectively (blocks 450, 460, 470 and 480). Thereafter, the BIOS passes control to the OS Loader (block 490).

Thereafter, the TPM can response to inquiry requests from a challenger to determine that the platform has been initialized and is trusted. The term "trusted" means that the platform should behave in an expected manner for an intended purpose.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An integrated circuit device comprising:
   a package;
   a boot block memory unit covered by the package, the boot block memory unit to provide boot information to a trusted platform module; and
   the trusted platform module in communication with the boot block memory unit and including a processor and a memory, the trusted platform module, covered by the package, to performs a hash operation on the boot information to produce a boot block identifier for storage within the memory.

2. The integrated circuit device of claim 1, wherein the trusted platform module and the boot block memory unit are employed on a single integrated circuit.

3. The integrated circuit device of claim 1, wherein the boot information includes an image of a boot block code.

4. The integrated circuit device of claim 1, wherein the boot block memory unit locates a basic input/output system (BIOS) and loads the BIOS into the trusted platform module.

5. The integrated circuit device of claim 4, wherein the trusted platform module performs a hash operation on the BIOS to produce a BIOS identifier for storage within the memory.

6. The integrated circuit device of claim 5, wherein the trusted platform module performs a hash operation on a basic input/output system (BIOS) extension to produce an extension identifier for storage within the memory.

7. The integrated circuit device of claim 5, wherein the trusted platform module performs a hash operation on an Operating System (OS) loader to produce an OS identifier for storage within the memory.

8. A platform comprising:

a processor;

an input/output control hub coupled to the processor; and an integrated circuit device coupled to the input/output control hub, the integrated circuit device comprises a package, a trusted platform module covered by the package, the trusted platform module comprises an internal memory and adapted to (1) performs a hash operation on one or more boot images of a boot block code to produce a boot block identifier for storage within the internal memory and (2) respond to an inquiry request from a challenger by providing information including the boot block identifier, and a boot block memory unit in communication with the trusted platform module and covered by the package, the boot block memory unit to provide the boot information to the trusted platform module.

9. The platform of claim 8, wherein the trusted platform module and the boot block memory unit of the integrated circuit device are employed on a single integrated circuit.

10. The platform of claim 8, wherein the boot information provided by the boot block memory unit of the integrated circuit device includes an image of a boot block code.

11. The platform of claim 8, wherein the boot block memory unit of the integrated circuit device locates a basic input/output system (BIOS) and loads the BIOS into the trusted platform module of the integrated circuit device.

12. The platform of claim 11, wherein the trusted platform module of the integrated circuit device performs a hash operation on the BIOS to produce a BIOS identifier for storage within the internal memory.

13. The platform of claim 8, wherein the trusted platform module of the integrated circuit device performs a hash operation on a basic input/output system (BIOS) extension to produce an extension identifier for storage within the internal memory.

14. The platform of claim 8, wherein the trusted platform module of the integrated circuit device performs a hash operation on an Operating System (OS) loader to produce an OS identifier for storage within the internal memory.

15. A method comprising:

extracting boot information by a trusted platform module from a unit located within a same integrated circuit package as the trusted platform module;

producing an identifier based on boot information by the trusted platform module;

recording the identifier within memory of the trusted platform module; and outputting information, including the identifier, in response to an inquiry request.

16. The method of claim 15 further comprising:

receiving an inquiry request; and providing the boot information in response to the inquiry request.

17. The method of claim 15 further comprising:

locating a basic input/output system (BIOS);

providing the BIOS to the trusted platform module;

performing a hash operation on the BIOS to produce a BIOS identifier; and storing the BIOS identifier in memory of the trusted platform module.

18. The method of claim 17 further comprising:

locating an operating system (OS) loader;

providing the OS loader to the trusted platform module;

performing a hash operation on the OS loader to produce a loader identifier; and storing the loader identifier in memory of the trusted platform module.

19. The software module loaded in internal memory for execution by a trusted platform module of a platform, the software module comprising:

code to locate a basic input/output system (BIOS) and to provide the BIOS to the trusted platform module;

code to perform a hash operation on the BIOS to produce a BIOS identifier; and code to store the BIOS identifier within the internal memory of the trusted platform module.

20. The software module of claim 19 further comprising:

code to detect an inquiry request; and code to output the boot information from the integrated circuit package in response to the inquiry request.

21. The software module of claim 19 further comprising:

code to locate an operating system (OS) loader;

code to provide the OS loader to the trusted platform module;

code to perform a hash operation on the OS loader to produce a loader identifier; and code to store the loader identifier within the internal memory of the trusted platform module.

* * * * *